No. 643,131.  
H. HEMPEL.  
APPARATUS FOR PRODUCING SPIRITS IN SOLID FORM.  
(Application filed Feb. 27, 1899.)  
Patented Feb. 13, 1900.
(No Model.)
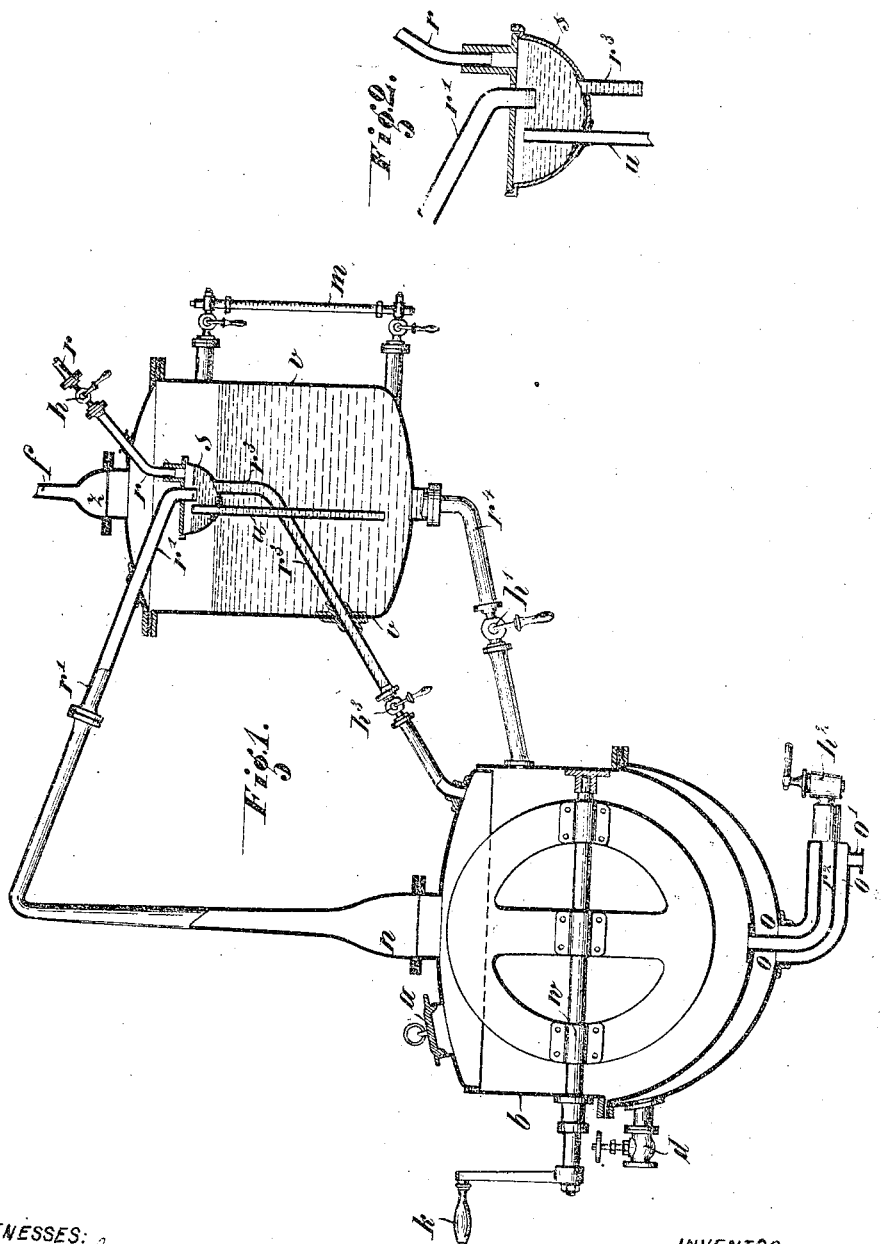
WITNESSES:
INVENTOR  
Heinrich Hempel  
BY  
Richards  
ATTORNEYS

UNITED STATES PATENT OFFICE.

HEINRICH HEMPEL, OF BERLIN, GERMANY.

APPARATUS FOR PRODUCING SPIRITS IN SOLID FORM.

SPECIFICATION forming part of Letters Patent No. 643,131, dated February 13, 1900.

Application filed February 27, 1899. Serial No. 707,051. (No model.)

*To all whom it may concern:*

Be it known that I, HEINRICH HEMPEL, a subject of the Emperor of Germany, residing at Berlin, Germany, have invented a certain new and useful Improved Apparatus for Producing Spirits in Solid Form, of which the following is a full, clear, and exact description.

The present invention consists of an apparatus for producing spirits in sold form, which is effected by mixing a certain percentage of a saponified mixture of mutton-fat and stearic acid with ethyl alcohol.

The object of the apparatus is to prevent loss of the product by evaporation and, furthermore, to enable the finished product to be drawn off in a warm and consequently fluid condition from the still.

In order to render the present specification more easily intelligible, reference is had to the accompanying drawings, in which similar letters of reference denote similar parts throughout the several views.

Figure 1 is a vertical section through the whole apparatus; and Fig. 2, a detail section, drawn to a larger scale, of the condensing vessel.

The apparatus comprises the following parts: A still $b$, having stirrer mechanism $w$ therein, with crank-handle $k$ to turn the same, and a fore-warming receptacle $v$, having the condensing vessel $s$ mounted therein and a gage-glass $m$ on the outside, an outlet-pipe $r^4$, with cock $h'$, from the fore-warming receptacle to the still, a steam-jacket $o$ around the lower part of the still, having a sleeve extending around and embracing the outlet-cock $h^2$ for the warm resulting mass, steam-inlet $d$ to the steam-jacket, inlet-opening $a$ for the pulverulent mass used to produce the spirit in solid form, and a vapor-outlet pipe $r'$, having dome $n$ at its point of juncture with the still and leading through the fore-warming receptacle to and through the cover of the condensing vessel $s$, said pipe $r'$ opening downwardly into the said vessel at a level slightly below the level of the overflow-pipe $u$ of said vessel, as will be seen from Fig. 2. The cover of the condensing vessel is further provided with a spirit-inlet-pipe connection $r$ with cock $h$. The outlet-pipe $r^3$ from the lower part of the condensing vessel is provided with a cock $h^3$ and opens into the still advantageously through the cover of the same. The overflow-pipe $u$ of the condensing vessel opens into the interior of the fore-warming receptacle $v$. The latter is provided with a dome $z$, from which a return-pipe extends upwardly in the well known manner, said pipe being indicated by $f$ and being of sufficient length to condense any vapors which may rise in the same from the receptacle $v$ and return them in liquid form to the said receptacle.

The device operates in the following manner: The pulverulent mass for making the solid spirits is introduced into the still $b$ through the opening $a$ and the latter then closed. The cock $h$ of the spirit-feed pipe $r$ is now opened and spirit allowed to flow into the condensing vessel $s$ and overflow into the receptacle $v$ through pipe $u$. The condensing vessel will thus be kept filled to a constant level—viz., the height of the overflow-pipe—and the amount of spirits allowed to flow through to $v$ may be ascertained and regulated by means of the gage-glass $m$. When the receptacle $v$ is sufficiently full, the cock $h'$ is opened and about one-third of the contents of the receptacle $v$ allowed to flow into the still $b$, whereupon the cock is again closed. The steam-valve $d$ is then opened and the still heated, thus causing the pulverulent mass above mentioned to be completely dissolved in the spirits. The waste water from the steam-jacket may run off at $o'$. By turning the handle $k$ the stirrer mechanism is set in motion and kept going during the process of dissolution. The spirits vaporized by the heat and stirring operation pass off through the dome $n$ and pipe $r'$ into the condensing vessel $s$, where they condense. As soon as the contents of the still $b$ have been perfectly dissolved the cock $h'$ is opened and the whole contents of the receptacle $v$ allowed to run into the still, whereupon the cock is again closed, the stirrer mechanism being again kept going the while. The spirit vapors formed in the still will pass, as specified, through $n$ and $r'$ to the vessel $s$, where they are condensed, the surplus contents of the said vessel overflowing into $v$. Owing to the peculiar construction of the condenser $s$ the vapors passing through the pipe $r'$ will always be condensed in $s$ under a constant pressure, whether the receptacle $v$ is full or empty. The level of the liquid in the condensing vessel is always constant, owing to the feed of vapor through $r'$ and the overflow $u$, while the arrangement of the end of the pipe $r'$ slightly below the level of the overflow-pipe causes all the vapors entering the vessel $s$ to pass into the liquid therein.

The finished product, which hardens very quickly, is drawn off from the still at $h^2$, the outlet-pipe being surrounded by the steam-jacket to insure that the whole of the product remains fluid until it is out of the still. After the still has been allowed to cool the cocks $h'$ and $h^3$ are opened and the contents of the vessel $s$ and the receptacle $v$ allowed to flow into the still, whence they may be drawn off through $h^2$.

I claim as my invention—

1. An apparatus for producing spirits in solid form consisting of the combination of a still having stirrer mechanism and steam-jacket, a fore-warming receptacle having mounted therein a condensing vessel, an overflow-pipe from the condensing vessel to the interior of the fore-warming receptacle, an outlet from the condensing vessel to the still and a vapor-conduit from the still to the said condensing vessel, the latter opening into the condensing vessel at a point below the level of the overflow-pipe, a spirit-feed pipe to the fore-warming receptacle and a spirit-outlet from the latter to the still and means for closing all the pipes according to requirement substantially as described.

2. The combination of a still as specified, having stirrer mechanism and steam-jacket, an outlet at the bottom of said still incased in the steam-jacket, a fore-warming receptacle having a condensing vessel mounted therein means for conducting the vapors from the still to the condensing vessel below the level of the contents of the same and for keeping said contents at a constant level during the operation of the apparatus, conduits from the receptacle to the still and from the condensing vessel to the still as also spirit feed and outlet pipes to the said receptacle substantially as described.

3. The combination of a still having outlet as specified, a fore-warming receptacle mounted at a higher level than the still and having mounted therein a condensing vessel as specified, means for conducting the vapors generated in the still to the condensing vessel below the level of the liquid therein, means for retaining the liquid therein at a constant level during operation, and for returning the condensed liquid to the still in part and in part to the receptacle through the overflow, a spirit-feed to the said receptacle and spirit-outlet from the latter to the still and a stirrer mechanism in said still substantially as described.

In witness whereof I have hereunto set my hand in presence of two witnesses.

HEINRICH HEMPEL.

Witnesses:
HENRY HASPER,
WOLDEMAR HAUPT.